Nov. 11, 1969  S. A. GARCIA  3,477,310
DUAL DRIVER CONTROLS OF THE CABLE TYPE FOR VEHICLES
WITH AUTOMATIC OR STANDARD TRANSMISSIONS
Filed Dec. 11, 1967  2 Sheets-Sheet 1
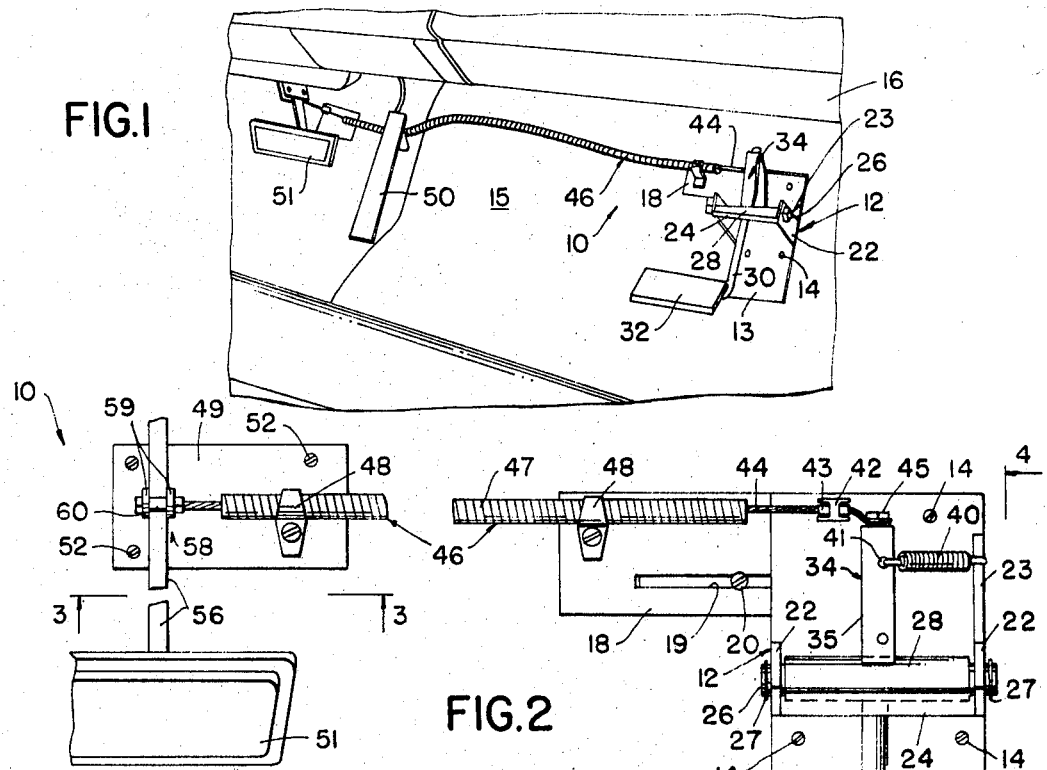
INVENTOR.
SALVADOR A. GARCIA
BY Whittemore, Hulbert
& Belknap
ATTORNEYS

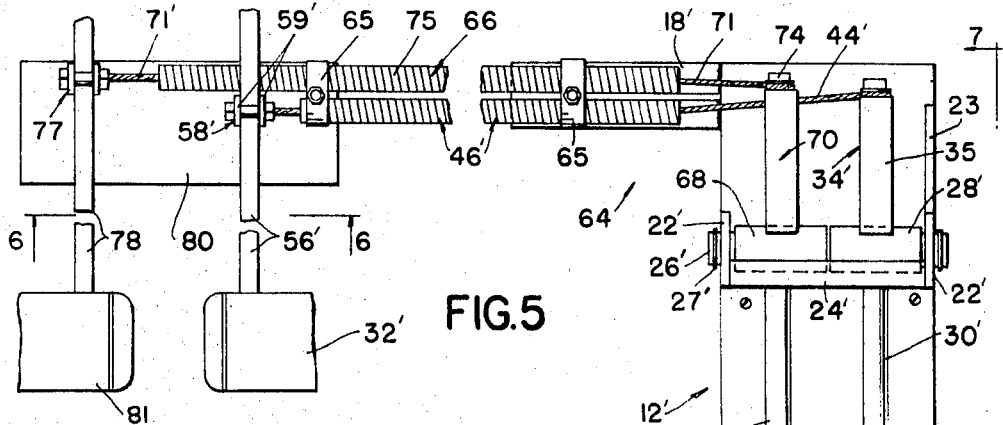
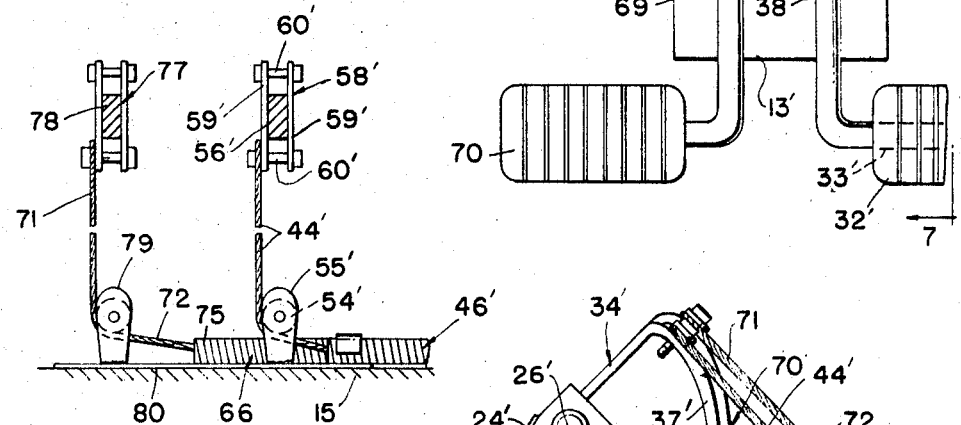
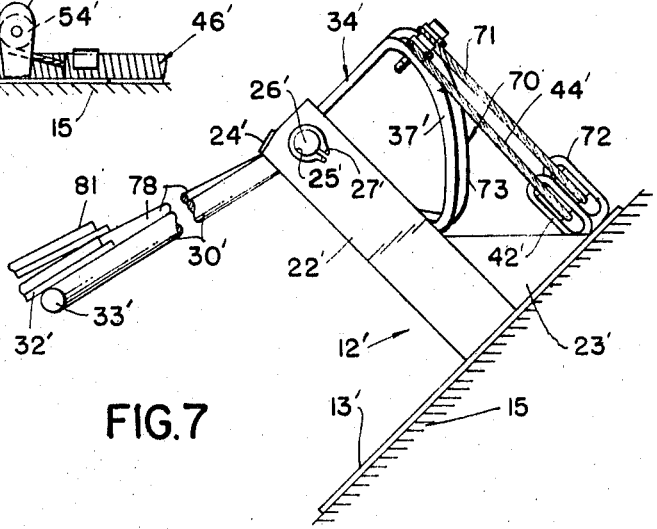
INVENTOR.
SALVADOR A. GARCIA

United States Patent Office 3,477,310
Patented Nov. 11, 1969

3,477,310
DUAL DRIVER CONTROLS OF THE CABLE TYPE FOR VEHICLES WITH AUTOMATIC OR STANDARD TRANSMISSIONS
Salvador A. Garcia, 15334 Artesian Ave., Detroit, Mich. 48223
Filed Dec. 11, 1967, Ser. No. 689,471
Int. Cl. G05g *1/14*
U.S. Cl. 74—562.5          2 Claims

ABSTRACT OF THE DISCLOSURE

Two versions of a cable-type control for student automobile driver training are disclosed, one for installation in a vehicle equipped with an automatic transmission and the other for a vehicle having a standard foot pedal-controlled transmission. The principle of operation and essential structural features of the control of the invention are the same in both adaptations.

That is, a rigid bracket is mounted to the floorboard of the automobile beneath its dashboard and on the side of the front seat occupied by the instructor; and this bracket pivotally supports, on a horizontal axis substantially above the floorboard, a foot pedal (or two pedals in the case of a standard transmission installation). Such pedal means is employed by the instructor to operate elongated flexible cable means extending over to the driver side of the vehicle front seat and operatively attached to the brake pedal (or brake and clutch pedals in a standard shift application). Appropriate floor bracket-mounted guide pulleys control the tension transmitting element of the cable, using a direct and efficient vertical action of said element in alignment with the driver pedal means. The usual cable conduit or sheath is anchored by appropriate clamps to the floorboard in the sub-dashboard zone of the vehicle.

The arrangement is such that the instructor may instantaneously take over the operation of the brake and/or clutch pedal in any possible emergency, overriding its operation by the student driver. Spring means of a suitable sort return the instructor pedal or pedals to a neutral position upon cessation of his control effort, also maintaining the cable's force transmitting element under continuing slight tension. Thus, the overriding action, when desired or necessary, is instantaneous and positive upon the application of pedal pressure by the instructor, i.e., without lost motion.

Background of the invention—Field

The invention affords a very simple and inexpensive type of dual driver control for quick and easy application to and removal from any of a number of different automobile makes and models, with the intention that a single automatic or standard transmission adaptation may be used year after year on different models.

The control, considered more basically, was specially devised for use in highschool driver training or education, with simplicity of installation and, more importantly, reliability and safety of operation being controlling considerations. The dual driver control arrangements will also be of value to any garage, service station or other commercial institution which may wish to offer driver instruction as a service to the public.

I am unaware of any prior art disclosure relating to a comparable dual driver control system which is adapted for use in association with either an automatic or a standard clutch pedal-controlled transmission. More particularly, I am aware of none having the simplicity, low cost, compactness and efficiency of a cable type control.

Summary of the invention

As indicated above, the two types of dual driver control of the invention were conceived and engineered with the specific object of being applicable quickly and easily to any of the makes and models of automobile presently or in the future available, domestic and foreign. Ease, speed and reliability of operation by the instructor are of the utmost importance, in view of the fact that a need for instantaneous emergency operation will frequently arise in the course of a normal day of driver training as part of a highschool curriculum.

It is also of importance, and a significant advantage of the control of the invention, that it may be compactly installed in an out-of-the-way space beneath the dashboard, so as not to interfere with freedom of leg movement of the driver, or instructor, if necessary. Whether applied to an automatic or standard transmission-equipped vehicle, the control is, furthermore, equally applicable to a special training automobile equipped with a second steering wheel for the instructor, or in a standard car lacking this feature.

Brief description of the drawings

FIG. 1 is a fragmentary perspective view illustrating a control unit pursuant to the invention in an automatic transmission embodiment.

FIG. 2 is a partially elevational and partially plan view, broken away, showing the basic pedal, mounting bracket and flexible cable components of the control of FIG. 1;

FIG. 3 is a fragmentary view, partially broken away, in vertical horizontal section on line 3—3 of FIG. 2, with a double-headed arrow indicating the action of the control or operating cable on the driver-operated brake pedal of the vehicle;

FIG. 4 is an end view, as from line 4—4 of FIG. 2, showing in solid line the normal or neutral position of the instructor-operated pedal and associated parts, as resiliently biased to that position and, in dot-dash line, the position of the parts under operation;

FIG. 5 is a view generally similar to FIG. 2 illustrating the dual control system of the invention as modified and applied to a standard, clutch pedal controlled, transmission-equipped automobile;

FIG. 6 is a fragmentary view in vertical section on line 6—6 of FIG. 5; and

FIG. 7 is an end elevation of the standard shift embodiment, as viewed from line 7—7 of FIG. 5.

Description of preferred embodiments

FIGS. 1–4 illustrate a relatively simple embodiment 10 of the dual control as devised for an automatic transmission-type vehicle, i.e., lacking clutch pedal provisions. It comprises a rigid floor bracket 12 which is, as illustrated in FIG. 4, in the general shape of an inverted T, including a large flat and rectangular floor plate 13 of steel secured rigidly by a plurality of self-threading screws 14 (FIGS. 1 and 2) to the forwardly and upwardly inclined portion 15 of the vehicle floor, beneath the dashboard 16 (FIG. 1) and in front of the side of the vehicle seat normally occupied by the instructor. Floor plate 13 is equipped with a rigid, coplanar welded side extension piece 18, which extension is milled horizontally at 19 to receive a self-threading screw 20 taking into the floor portion 15. This allows plate 13 and parts mounted thereon to be properly positioned at the time of installation, and prior to application of the permanent floor-attaching screws 14, so that the cable provisions (to be described) may be properly set up for best operation.

The mounting bracket 12, in addition to its floor plate 13, comprises a pair of parallel, laterally spaced uprights 22, which may be weld-connected at their bottoms to plate 13 adjacent the side of the latter; and the right-hand (FIG. 2) upright 22 of these two is provided with a triangular anchor piece 23, which may be welded firmly to the upright and to the floor plate 13. A steel strap 24 is welded at its ends across and to the tops of uprights 22 to rigidify bracket 12, the straps 24 also serving a stop function, to be described.

The bracket uprights 22 are formed with transversely aligned, circular openings 25 adjacent the tops thereof, which openings pivotally receive a sturdy, transversely elongated and cylindrical pivot pin 26. Split snap rings 27 are applied to the ends of this pin outwardly of the respective bracket uprights 22 to restrain pivot pin 26 against undue transverse shift relative to bracket 12.

Within the uprights 22 the pivot pin is surrounded with only running clearance by a tubular pivot member or sleeve 28; and an elongated, L-shaped brake operating rod 30 is rigidly welded at its stem end to one side of pivot sleeve 28, centrally of the length of the latter. As spring-biased by means to be described, operating rod 30 will normally upwardly abut the cross piece 24 at the tops of bracket uprights 22, the rod thus being limited by the piece in the clockwise (FIG. 4) direction. A suitable pedal member 32 is welded to the transverse arm portion 33 of rod 30, as shown in FIG. 2.

The sleeve 28 has a generally triangular and quadrant-shaped, cable tensioning extension arm 34 welded thereto at a point substantially diametrically opposite operating rod 30. This union is effected at the zone of convergence, as shown in FIG. 4, of upper and lower members or portions 35, 36, respectively, of extension arm 34; and these arm members are integrally connected by a convexly arcuate quadrant portion 37, which is otherwise substantially flat-faced in the horizontal sense.

Foot-operated rod 30, pivot sleeve 28 and extension arm 34 thus constitute an instructor-operated brake lever or pedal, generally designated 38, as pivotally mounted on the bracket supported pin 26; and the pedal 38 is biased clockwise, as viewed in FIG. 4, by an elongated coil tension spring 40. The spring is anchored at its lower end to the floor plate bracket piece 23 connecting at its upper end into an opening 41 in the member 35 of pedal 38.

As best shown in FIGS. 2 and 4, the bracket floor plate 13 has welded thereto, in upstanding relation thereto, a simple and conventional pulley 42, the sheave or wheel 43 of which is on an axis in a plane paralleling the vertical plane of swing of pedal 38, and but a trifle offset from that exact plane; and a conventional flexible steel tension-transmitting and operating cable element 44 passes downwardly over the flat curved quadrant surface 37, then trains upwardly about pulley wheel 43, being tightly secured by bolt and washer means 45 to quadrant portion 37 of the pedal extension arm 34, just beneath the top of that portion, as appears in FIG. 4.

The relationship of the parts, when properly installed and adjusted, is such that, upon rocking movements of pedal 38, opposed or assisted by spring 40, the cable element 44 winds and unwinds around the quadrant arm portion 37 to a degree determined precisely by the amount of pedal depression. FIG. 4 shows the pedal in solid line in a neutral, normal or inactive position, as biased clockwise by spring 40 and stopped in this position by the bracket cross piece 24. The same view indicates, in dot-dash line, the pedal 38 operated counterclockwise to tension cable element 44.

The cable, generally designated 46, of which element 44 is a part, extends horizontally, and well beneath dashboard 16, from the instructor-controlled location to the driver location, the usual flexible protective conduit or sheath 47 of the cable being anchored to the floorboard portion 15, as by at least two cable clamps 48. One of these is releasably attached to the bracket plate extension 18 and the other to a second, relatively small rectangular floor-mounted plate 49.

This plate is located on the side of the auto's accelerator pedal 50 remote from the instructor-operated part of the equipment 10; and in making the installation the left hand end (FIGS. 1, 2 and 3) of the cable 46, as clamped to plate 49 will first be brought beneath the accelerator pedal 50, being attached to floor portion 15 directly behind the usual brake pedal 51 of the vehicle. The floor attachment of plate 49 is through the agency of self-threading screws 52. Further description in respect to the mode of installation of control 10 will follow.

As best shown in FIGS. 2 and 3, the force-transmitting element 44 of cable 46 is trained underneath the sheave or wheel 54 of a second small guide pulley 55, which pulley is welded to plate 48 directly beneath the brake operating arm or lever 56 of pedal 51. Rounding beneath sheave 54, the end of cable element 44 extends upwardly in a plane slightly outwardly paralleling the plane of action of arm 56 (FIG. 3). A plate-type yoke 58 is rigidly but removably connected to brake arm 56 forwardly of the pedal 51, yoke 58 comprising a pair of small plates 59 clamped against opposite sides of arm 56 by bolts 60, the lowermost of which is longer than the uppermost. Cable tension element 44 is equipped at its end with a loop 61 tightly defined by a split clamp collar 62, the loop engaging around the end of the lowermost bolt 60 and being held in place by nut and washer means 63.

In making the installation of this simpler, automatic transmission version 10 of the dual control, the left hand end of cable sheath 47, as rigidly mounted by a clamp 48 to the small floor plate 49, is passed with the plate beneath the accelerator pedal 50. The adjacent end of cable element 44 is then clamped by yoke 58 to the brake arm or levre 56, as shown in FIGS. 2 and 3. Plate 49 is then positioned so that its pulley 55 is substantially in the vertical plane of action of brake operating arm 56, whereupon plate 49 is tightly connected by screws 52 to the floorboard. This can be done at the time of installation by punching screw receiving holes in the board.

The main bracket plate 13 is then positioned to the right (FIGS. 1 and 2), with its clamp 48 loose, so that its pulley 42 is located approximately at or fairly closely adjacent the plane of action of the instructor-operated pedal 38 of the control, this being done while the self-tapping screw 20, as positioned in slot 19 of the plate extension 18, is taken up but lightly in floor portion 15. With the cable sheath 47 thus properly located, having slipped freely through the right hand clamp 48, the latter is then taken up tightly on cable 46. Bracket 12 is next shifted somewhat to the right to properly tension cable element 44 initially; this is as said element is connected to brake arm 34 with the latter spring biased fully clockwise (FIG. 4). Screws 14 and 20 are then taken up tightly to complete the installation. As before, the floor holes will have been just previously punched.

The operation of the control 10 is believed self-evident from the foregoing description. Upon the instructor depressing pedal 38 the cable tension element 44 is, instantaneously and without lost motion, tightened against the opposition of spring 40 (and of course the normal opposition of the braking load) to apply the vehicle brakes in a fast, reliable and safe way. Release of operating pressure at pedal member 32 is accompanied by a spring restoration from the dot-dash line position of FIG. 4 to the solid line position.

The embodiment, generally designated 64, of the invention which is applicable to a vehicle having a standard clutch pedal-controlled transmission, as illustrated in FIGS. 5, 6 and 7, substantially duplicates the brake control provisions shown in FIGS. 1–4 and described above. Accordingly, components and relationships corresponding to those mentioned above have been designated by corresponding reference numerals, primed, and further detailed description thereof is dispensed with. It may be noted, with reference to FIG. 5, that in the interest of compactness the sleeve 28' to which the instructor-operated brake rod 30' and arm 34' are connected is of aproximately half the axial length of the corresponding sleeve 28. Likewise, the cable clamps, specially designated 65, are of a known dual type designed to act on both the brake operating cable 46' and on a second clutch operating cable, generally designated 66. In all other respects the brake operating features of the two embodiments are identical save as to cable length.

Furthermore, the cable 66 and parts operatively associated therewith are in effect reproductions of the parts involved in the brake operation, hence may be very briefly described. Thus, the pivot sleeve 68 to which the instructor-operated pedal rod 69 and its quadrant-like extension arm 70 are connected are in practically all respects identical to their brake counterparts 28', 30' and 34'. The tension element 71 of cable 66, as trained about a plate-mounted pulley 72 (FIG. 7), connects similarly to the arcuate portion 73 of the quadrant arm through the agency of bolt and washer means 74; the sheath 75 of cable 66 is floor-anchored, side-by-side, with that of cable 46' by the clamps 65 (FIG. 5); and cable element 71 is releasably clamped by means of a yoke 77 to the clutch operating arm or lever 78, which yoke is the same as the yokes 58 and 58'. Similarly, a pulley 79 on floor plate 80, under which pulley the cable tension element 71 is trained, is located by the floor plate directly beneath and in the vertical plane of action of clutch arm 78. The operating pedal member of the latter is designated 81.

Quite obviously, the mode of installation of the standard transmission-type control 64, and its manner of operation under dual brake and clutch control by the instructor, are the same as described above in reference to FIGS. 1–4, hence need not be repeated. It is also obvious, that the unit 64 has the same advantages in point of compactness, low cost, instantaneous and reliable response to instructor pedal depression, etc.

What is claimed is:

1. A dual driver control for automobile driver training and the like, comprising an instructor-operated unit adapted to be connected to a driver-operated unit to govern a sub-dashboard pedal member of the latter, said instructor-operated unit including a mounting plate, fasteners removably attaching said mounting plate rigidly to the floorboard of the automobile beneath the latter's dashboard, said mounting plate having a horizontal slot therein, one of said fasteners being slidably received in said slot and adapted to be installed before the remaining fasteners so that said mounting plate may be attached to the floorboard in desired transverse spacing from the driver-operated unit, an upright bracket on said mounting plate, a pedal control member pivotally mounted adjacent the top of said bracket on a horizontal axis for movement in a vertical plane parallel to the longitudinal center line of the automobile, a quadrant-like part secured to said pedal control member having an arcuate peripheral portion concentric with said horizontal axis, a pulley fixedly mounted on said plate adjacent said vertical plane for rotation on an axis parallel to said vertical plane, and a flexible, non-extensible, tension-transmitting cable extending between said units in a zone beneath the dashboard being trained about said pulley, said cable being operatively connected at one end to said arcuate peripheral portion of said part adjacent the upper end thereof and operatively connected at the other end to the pedal member of the driver-operated unit, whereby pedal actuation of said pedal control member results in a simultaneous corresponding actuation of the pedal member of the driver-operated unit, said arcuate peripheral portion of said part being substantially tangent to the plane of rotation of said pulley and said cable passing about said arcuate peripheral portion when said pedal control member is actuated as aforesaid.

2. The control defined in claim 1, wherein said driver-operated unit has a pair of said pedal members, one to actuate a brake and the other to actuate a clutch, said instructor-operated unit having a pair of said pedal control members coupled respectively by pairs of said pulleys and cables to the pedal members of the driver-operated unit.

References Cited
UNITED STATES PATENTS 2,710,547  6/1955  Davenport _____ 74—562.5
2,720,121  10/1955  Holum.

A. HARRY LEVY, Primary Examiner

U.S. Cl. X.R.
180—77